Patented Nov. 19, 1940

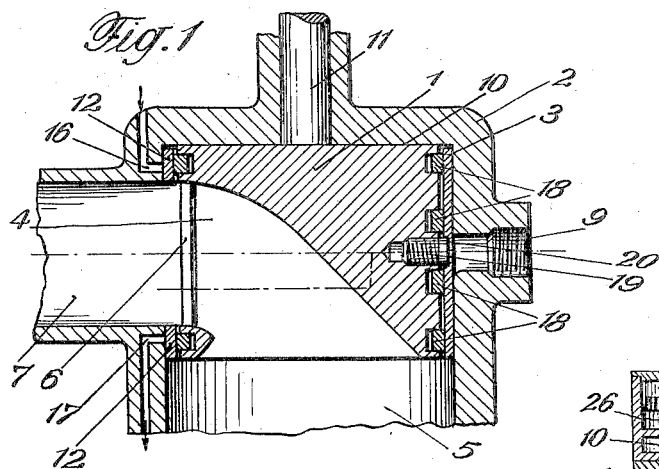
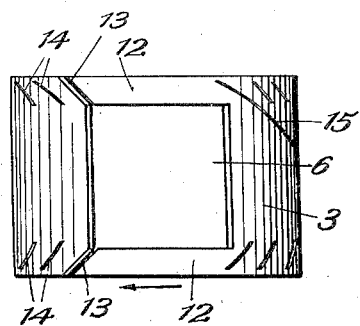
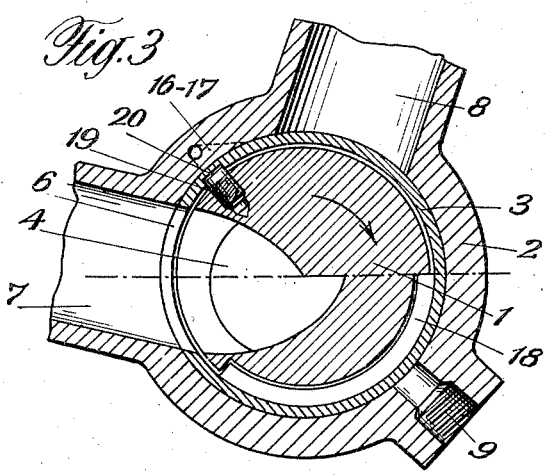
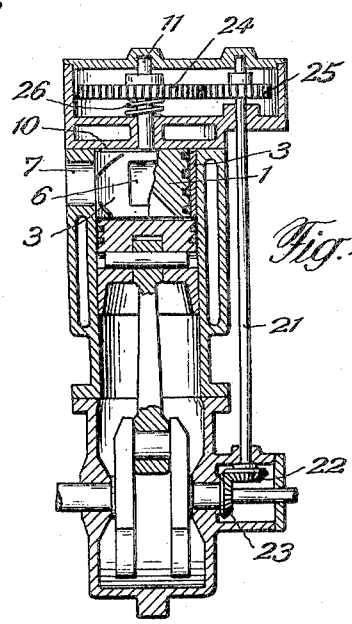

2,222,059

UNITED STATES PATENT OFFICE 2,222,059

ROTARY VALVE OPERATED INTERNAL COMBUSTION ENGINE

Carlo Monleone, Lugano, Switzerland

Application June 6, 1939, Serial No. 277,703
In Switzerland September 28, 1938

6 Claims. (Cl. 123—80)

This invention relates to rotary valve operated internal combustion engines wherein the valve body is cylindrical and for facilitating the heat exchange a plurality of heat conducting rings are provided between the valve body and a sleeve surrounding this body, which rings are inserted in the valve body and bear against the sleeve from within.

This arrangement allows for the rotary valve and the surrounding sleeve to expand entirely unhindered.

In the accompanying drawing an embodiment of the invention is illustrated by way of example only, in which Fig. 1 is a vertical section of the cylinder head and the rotary valve of an internal combustion engine embodying the invention;

Fig. 2 shows a side elevation of the sleeve surrounding the body of the rotary valve;

Fig. 3 is a horizontal section of Fig. 1, and

Fig. 4 shows a vertical elevational section of the assembled parts of the internal combustion engine.

The numeral 1 designates the cylindrical rotary valve 1 arranged in the cylinder head 2. The valve is completely surrounded by an elastically resilient sleeve 3 and the axis of rotation of the valve coincides with the axis of the cylinder. The sleeve is slightly spaced from the valve body so as to be expansible independently of the valve body.

In the rotary valve 1 a hollow space 4 is provided which forms the combustion chamber and flares downwardly toward the cylinder space 5 and sidewardly toward the seat of the sleeve 3 surrounding the rotary valve or briefly the valve sleeve. The circumferential aperture of the body of the rotary valve corresponds to the port opening 6 of the sleeve 3. Through this circumferential aperture the combustion chamber and thus the entire cylinder space are successively put in communication with the exhaust pipe 7, the admission pipe 8 and the well 9 of the spark plug or injection orifice, which is advantageously arranged in the cylinder head, in which way the whole working cycle is completed. This is effected by deriving the drive of the rotary valve 1 from the crank shaft of the internal combustion engine by means of a bevel gear drive 22, 23, a vertical transmission shaft 21, and two intermeshing spur gears 24, 25. A spring 26 urges the rotary valve constantly against its seat, that is, the inner surface 10 of the cylinder head, with slight pressure (Fig. 4).

This surface 10, which is circular, bears against the outer end surface of the valve body, from the central portion of which extends the driving axle 11 on which the spur gear wheel 24 is mounted and said surface serves as a thrust bearing for the transmission of the axial component of the combustion pressure to the cylinder head, while at the same time the exchange of heat between the rotary valve and the cylinder head takes place at the surface 10.

The valve sleeve 3 functions as a sealing member by exerting a slight pressure on the seat of its outer sliding surface by inherent spring action. The sleeve 3 is of hollow cylindrical shape and the opening 6 in its wall serves for the admission and discharge of the gases. This opening is bordered at the margins of the sleeve above and below by two tongues 12 and the sleeve is split at the forward ends of these tongues regarding the direction of rotation of the sleeve. The two splits 13 of the sleeve communicating with the opening 6 are inclined to the generatrix of the cylindrical sliding surface of the sleeve at a certain oblique angle considering the direction of rotation of the sleeve, in such a way, as to prevent the lubricating oil from discharging in the axial direction by the conveying action exerted on the oil by the helically inclined splits during the rotational movement of the sleeve. Short grooves 14 arranged in the sliding surface of the sleeve serve for the same purpose. At each end of the sleeve a row of grooves is provided. The grooves are inclined to the generatrix of the sliding surface at angles ranging from about 70° to 85° and extend inwardly from the respective marginal portion of said surface and rearwardly considering the direction of rotation of the sleeve, so as to exert pressure on the liquid lubricant in a direction away from the margins toward the middle of the sliding surface. The splits 13 of the sleeve extend at the same inclination as the grooves in the corresponding rows. The amount of lubricating oil conveyed over the seating surface of the outer sliding surface of the valve body depends upon the number and the inclination of the grooves.

In addition, a lubricating oil distributing groove 15 is provided in the sliding surface which spreads the oil supplied under pressure through an oil supply passage 16 over the sliding surface of the sleeve so as to lead it toward an oil discharge passage 17.

These oil supply and oil discharge passages communicating with the oil grooves as well as the spark plug well and the guide or driving stud 19 for the sleeve are all turned into the picture plane of Fig. 1 in order to make these parts more plainly visible.

The actual relative positions of these parts are shown in Fig. 3. The lubricating oil supply and discharge passages 16 and 17, respectively, are arranged between the gas admission and gas exhaust pipes, as clearly shown in Fig. 3. This arrangement results in fact that the splits of the sleeve wipe past the oil grooves only when the pressure in the cylinder is zero or is very small. Consequently, detrimental pressures are prevented from arising in the oil conduits.

Between the rotary valve and the sleeve surrounding the same sufficient clearance is provided to allow independent relative expansion. The exchange of heat between the rotary valve, the sleeve and the cylinder head takes place through the heat conducting rings 18 inserted in cut-out recesses in the body of the rotary valve and bearing on the inner surface of the valve sleeve. These rings, which are made of a material of a high heat conductivity, serve for facilitating the exchange of heat between the rotary valve and sealing sleeve and thence to the cooling surfaces of the cylinder. Furthermore, these rings have the effect of relieving the valve sleeve from the combustion pressures to a certain extent and from the consequent bearing pressure between the valve sleeve and the seat thereof in the cylinder head. Therefore, this bearing pressure can be influenced to a considerable extent by appropriately choosing the cross section of the heat conducting rings. The heat conducting rings for exerting pressure and for conducting heat serve in addition a third important purpose, namely, of providing efficient protection against overheating of the valve sleeve.

As is evident from the drawing, the rings cover a large part of the inner cylindrical surface of the valve sleeve. It will thus be readily seen that only the surface portions located between each two adjacent rings are exposed to the hot combustion gases directly.

Therefore, the heat conductive rings also serve for influencing the temperature of the valve sleeve dependent upon the number of rings used.

The outer heat conducting rings bear against the valve sleeve over all the inner circumference thereof and are positioned exactly behind the tongues. The inner heat conducting rings are shortened in agreement with the circumferential opening of the sleeve, that is, they are made to bear against the circumference of the valve sleeve only along a portion thereof.

The sleeve surrounding the valve is imparted rotational movement by only one stud 19 which is housed in the valve body. This stud fits exactly in a mating bore 20 extending into the wall of the valve sleeve only for a part of its thickness and lying in the transverse plane passing through the middle of the sleeve between the margins thereof.

This arrangement alone makes it possible for the rotary valve and the sleeve surrounding the same to expand entirely unhindered and to obtain perfectly symmetrical and tangential guidance for the sleeve by the stud, due to the stud engaging with the sleeve at a point in close proximity to the sliding surface of the sleeve.

I claim:

1. In a rotary valve operated internal combustion engine, a cylinder having an inlet port and an exhaust port, a rotary valve comprising a cylindrical body having an opening serving as the combustion space of the engine, arranged in the head of said engine cylinder for cooperation with the inlet and exhaust ports thereof, a ported sleeve surrounding said valve body in radially spaced relation to said valve body and rotationally fixed relative thereto, and having an outer sliding surface, said valve body having annular recesses formed therein, annular heat conducting members for facilitating the exchange of heat between said valve body and said valve sleeve inserted in said recesses of said valve body and closely bearing against the inside of said valve sleeve, said heat conducting members having large outer bearing surfaces so as to contact said sleeve over a substantial portion of the inside thereof, for materially reducing the area of said inside contacted by hot combustion gases for preventing said sleeve from becoming excessively hot.

2. In a rotary valve operated internal combustion engine, a cylinder having an inlet port and an exhaust port, a rotary valve having a cylindrical body, arranged in the head end of said engine cylinder for cooperation with the inlet and exhaust ports of said cylinder, a ported sleeve surrounding said valve body in radially spaced and rotationally fixed relation to said body and having an outer sliding surface, said valve body having recesses formed therein for accommodating heat conducting members, heat conducting members for facilitating the exchange of heat between said valve body and said valve sleeve inserted in said recesses of said valve body and bearing against the inside of said valve sleeve, over a substantial portion of said inside, one of said members above said valve port and one below said port being annular and situated on said inside of said valve sleeve and bearing against said sleeve over all the inner sleeve circumference, and mating bearing surfaces provided on said portion of said inside, for materially reducing the area of said inside contacted by hot combustion gases for preventing said sleeve from becoming excessively hot.

3. In a rotary valve operated internal combustion engine, a cylinder having an inlet port and an exhaust port, a rotary valve having a cylindrical body, arranged in the head end of said engine cylinder for cooperation with the inlet and exhaust ports of said cylinder, a ported sleeve surrounding said valve body in radially spaced and rotationally fixed relation to said body and having an outer sliding surface, said valve body having annular peripheral recesses one above and one below said port, annular heat conducting members for facilitating the exchange of heat between said valve body and said valve sleeve inserted in said recesses for bearing against the inside of said valve sleeve, over a substantial portion of said inside, other heat conducting members situated between said valve body and said sleeve at levels within the vertical range of the ported portion of said valve sleeve but on the opposite side from said port and bearing against said sleeve only along a part of the inner sleeve circumference, and mating bearing surfaces provided on the adjacent portion of the valve body, for substantially reducing the area of said inside contacting with hot combustion gases for preventing said sleeve from becoming excessively hot.

4. In a rotary valve operated internal combustion engine, a cylinder having a central lateral inlet port and a central lateral exhaust port in its head end, a rotary valve having a cylindrical valve body, arranged in the head end of said engine cylinder for cooperation with the inlet and exhaust ports of said cylinder, a ported sleeve surrounding said valve body in fixed rotational relation thereto and radially spaced therefrom and having an outer cylindrical sliding surface provided towards the margins thereof with a row of short grooves providing oil-wiping means, said grooves being inclined to the generatrix of the cylinder surface so as to extend from the marginal portions of said sleeve inwardly and rearwardly considered with respect to the direction of rotation of said valve, for exerting pressure on the liquid lubricant in a direction away from said margins toward the middle of said sliding surface, annular heat conducting members for facilitating the exchange of heat between said valve body and said valve sleeve inserted in said valve body for said members having large outer bearing surfaces for bearing against the inside of said valve sleeve over a substantial portion of said inside and remaining stationary relative thereto, and mating bearing surfaces provided on said portion of said inside, for materially reducing the area of said inside contacted by hot combustion gases for preventing said sleeve from becoming excessively hot.

5. In a rotary valve operated internal combustion engine, a cylinder having charging and exhaust ports near its head end, a rotary valve having a cylindrical body, arranged in the head end of said cylinder for cooperation with the inlet and exhaust ports of said cylinder, a split sleeve surrounding said valve body in radially spaced and fixed rotational relation thereto, said sleeve having a lateral port intermediate its ends, and having an outer cylindrical sliding surface provided towards the margins thereof with a row of short grooves providing oil-wiping means, said grooves being inclined relative to the generatrix of the cylinder surface at angles between 70° and 85° so as to extend from the marginal portions of said sleeve inwardly and rearwardly considered with respect to the direction of rotation of said valve, two marginal tongues on said sleeve bordering the port opening and extending rearwardly from two splits of said sleeve considered with respect to the direction of rotation of said valve, said splits communicating with said opening and being inclined in parallelism with said grooves, for exerting pressure on the liquid lubricant in conjunction with said grooves in a direction away from said margins towards the middle of said sliding surface, said valve body having annular recesses formed therein, annular heat conducting members for facilitating the exchange of heat between said valve body and said valve sleeve inserted in said valve body recesses and bearing against the inside of said valve sleeve, said heat conducting members having large outer surfaces so as to contact said sleeve over a material portion of the inside thereof, and mating bearing surfaces provided on said portion of said inside, for materially reducing the area of said inside contacted by hot combustion gases for preventing said sleeve from becoming excessively hot.

6. In a rotary valve operated internal combustion engine, a cylinder having inlet and exhaust ports, a rotary valve comprising a cylindrical body having an opening serving as the combustion space of the engine, arranged in the head of said engine cylinder for cooperation with the inlet and exhaust ports thereof, a resiliently expansible ported sleeve surrounding said valve body in radially spaced and rotationally fixed relation thereto, said valve body having annular recesses formed therein, and annular heat conducting members for facilitating the exchange of heat between said valve body and said valve sleeve inserted in said recesses of the valve body and bearing against the inside of said valve sleeve for reducing the area of said sleeve contacted by combustion gases, said heat conducting members remaining stationary relative to said valve body and sleeve.

CARLO MONLEONE.